United States Patent [19]

Hellon

[11] Patent Number: 5,615,967
[45] Date of Patent: Apr. 1, 1997

[54] BALL JOINT LINK

[75] Inventor: Keith Hellon, Libertyville, Ill.

[73] Assignee: Maclean-Fogg Company, Mundelein, Ill.

[21] Appl. No.: 253,688

[22] Filed: Jun. 3, 1994

[51] Int. Cl.$^6$ ............................ F16C 11/00; F16C 11/06; F16D 1/12; B25G 3/34
[52] U.S. Cl. ........................ 403/133; 403/56; 403/122; 403/130; 403/269
[58] Field of Search .................................. 403/122, 128, 403/130, 133, 134, 140, 56, 76, 77, 141, 27

[56] References Cited

U.S. PATENT DOCUMENTS

| | | |
|---|---|---|
| 1,909,430 | 5/1933 | Skillman . |
| 1,943,631 | 1/1934 | Skillman . |
| 2,027,560 | 1/1936 | Skillman . |
| 2,954,992 | 10/1960 | Baker . |
| 3,011,219 | 12/1961 | Williams . |
| 3,094,376 | 6/1963 | Thomas . |
| 3,591,669 | 7/1971 | Memory . |
| 3,941,495 | 3/1976 | Duncan . |
| 4,290,181 | 9/1981 | Jackson . |
| 4,439,909 | 4/1984 | Borgen et al. . |
| 4,887,486 | 12/1989 | Wood, Jr. ........................ 74/588 X |
| 4,973,372 | 11/1990 | Ditlinger . |
| 5,009,538 | 4/1991 | Shiral et al. . |
| 5,011,320 | 4/1991 | Love et al. . |
| 5,011,321 | 4/1991 | Kidokoro . |
| 5,078,531 | 1/1992 | Sakai et al. . |
| 5,140,869 | 8/1992 | Mrdjenovich et al. . |
| 5,150,981 | 9/1992 | Miwa . |
| 5,152,628 | 10/1992 | Broszat . |
| 5,163,769 | 11/1992 | Dresselhouse ........................ 403/27 |
| 5,178,482 | 1/1993 | Wood . |
| 5,267,805 | 12/1993 | Ueno et al. . |
| 5,277,860 | 1/1994 | Sinclair . |

FOREIGN PATENT DOCUMENTS

| | | |
|---|---|---|
| 0250063 | 12/1987 | European Pat. Off. . |
| 0411777 | 2/1991 | European Pat. Off. . |
| 2670255 | 6/1992 | France . |
| 59-062722 | 4/1984 | Japan . |
| 60-151414 | 8/1985 | Japan . |
| 450827 | 1/1968 | Switzerland . |

*Primary Examiner*—Kenneth J. Dorner
*Assistant Examiner*—Bruce A. Lev
*Attorney, Agent, or Firm*—Brinks Hofer Gilson & Lione

[57] ABSTRACT

A ball joint link includes a center tube and a ball stud. A one-piece, thermoplastic, molded housing extends around the ball to form a ball joint and is secured to the tube. The tube and the ball of the ball stud are both insert molded in the housing in a single molding operation, and the housing is formed of a glass-filled nylon that forms the bearing surface for the ball joint.

28 Claims, 3 Drawing Sheets

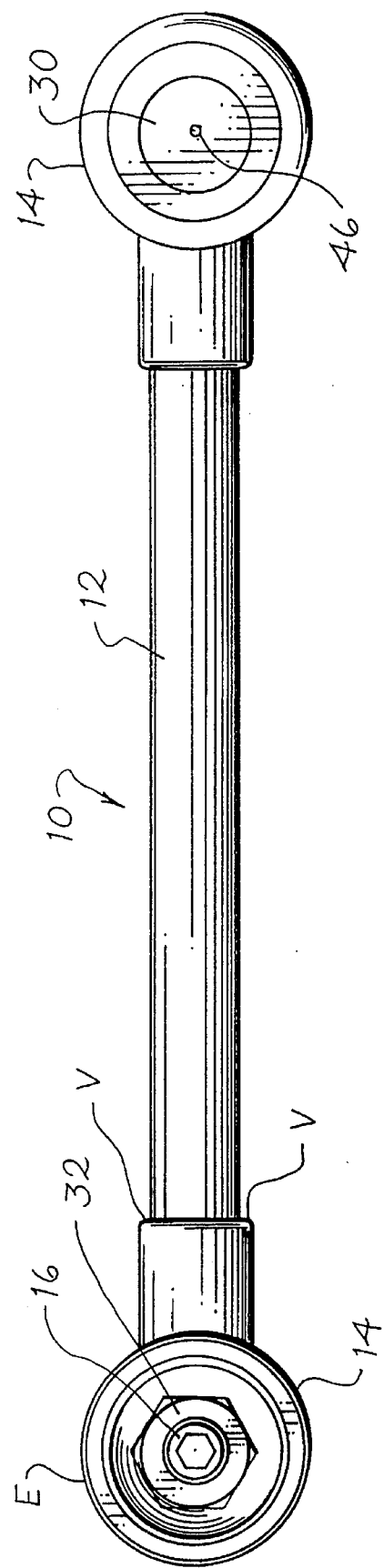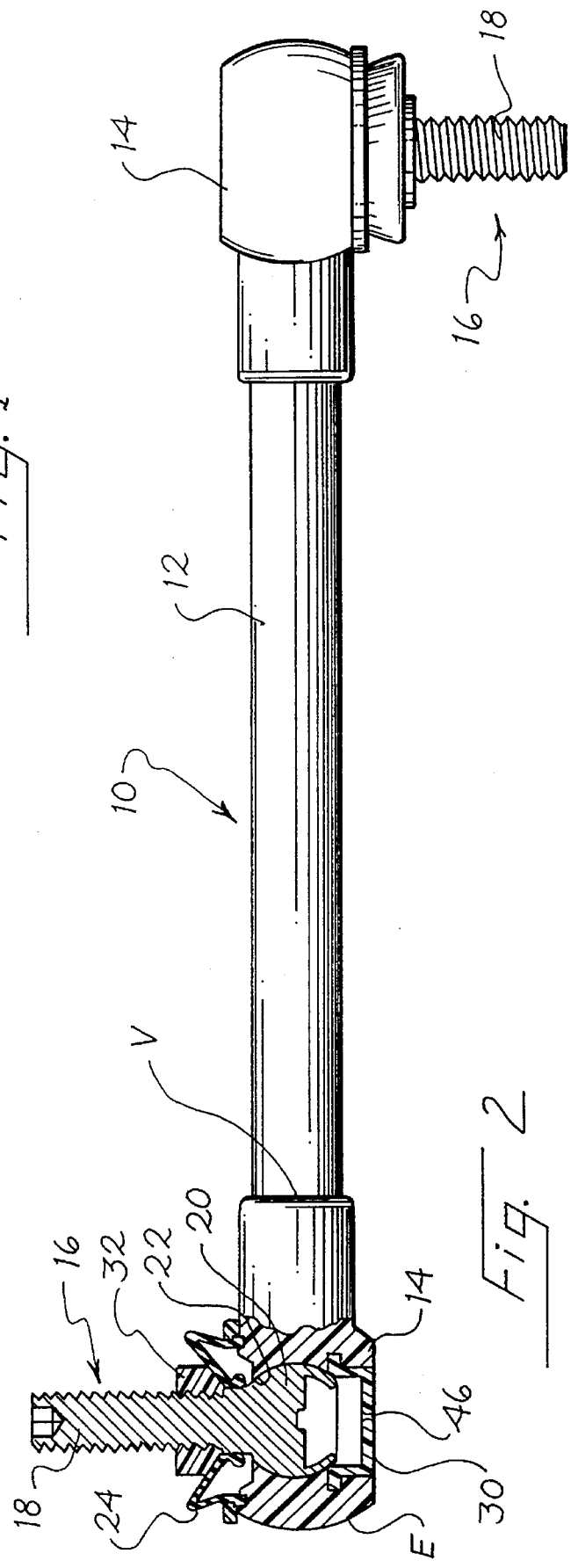

BALL JOINT LINK

BACKGROUND OF THE INVENTION

This invention relates to an improved ball joint link that is unusually light in weight and inexpensive to manufacture, and to a method for forming such a link.

Molding techniques in the past have been used in the fabrication of various ball joint components. For example, Duncan U.S. Pat. No. 3,941,495 teaches a method for molding a ball around a stud to form a ball stud.

Sinclair U.S. Pat. No. 5,277,860 discloses an all plastic rod end in which opposed raceways are mated to form a socket around a ball. The raceways are then over-molded to complete fabrication of the rod end.

Memory U.S. Pat. No. 3,591,669 discloses a plastic universal bearing which is molded in place in a link. In this case, the plastic that forms the socket of the ball joint is integral with the plastic that forms the center section of the link.

SUMMARY OF THE INVENTION

This invention is directed to an improved ball joint link that simplifies assembly while providing excellent strength and cost efficiency, and to a method for forming such a link.

According to a first aspect of this invention a ball joint link is provided comprising a tubular center section and a ball stud. A molded housing is secured to the end of the center section to extend around the ball of the ball stud and thereby form a ball joint. The end of the center section and the ball are both insert molded in the housing in a single molding operation. According to a second aspect of this invention, a ball joint link having a center section and a ball stud as described above is provided with a molded housing secured to the end of the center section and extending around the ball to form a ball joint. The housing comprises a fiber-reinforced plastic material both in the first region adjacent to the ball and in a second region adjacent to the end.

According to the method of this invention, a ball joint link is formed by positioning a tubular center section and a ball stud in an insert mold. Then a plastic material is flowed around a ball forming portion of the ball stud and the end portion of the tubular center section to form a ball joint housing with the center section end portion and the ball forming portion insert molded in place in the housing.

It has been surprisingly discovered that fiber reinforced plastic materials can be used to form the bearing surface of the ball joint around the ball stud. In this way excellent tensile strength is obtained and the need for a bearing liner between the housing and the ball stud is eliminated.

BRIEF DESCRIPTION OF THE DRAWINGS

FIG. 1 is a top view of a ball joint link that incorporates a first presently preferred embodiment of this invention.

FIG. 2 is a side view in partial cut away of the ball joint link of FIG. 1.

DETAILED DESCRIPTION OF THE PRESENTLY PREFERRED EMBODIMENTS

Figure 3:
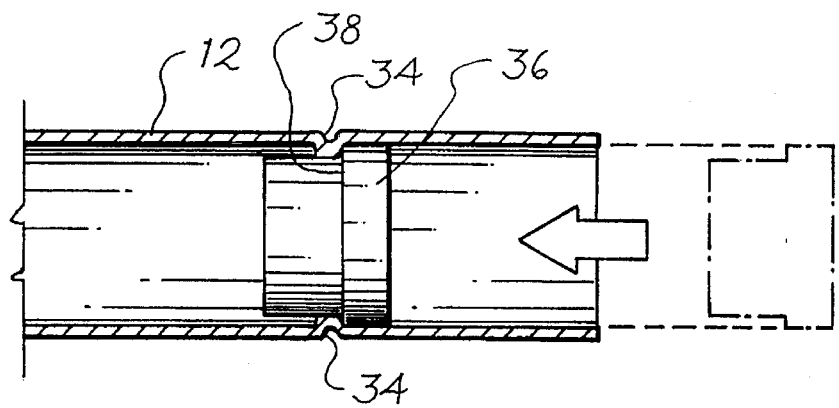
FIG. 3 is a fragmentary longitudinal sectional view of a portion of the link of FIGS. 1 and 2 at a first stage of assembly.

Turning now to the drawings, FIGS. 1 and 2 show overall views of a ball joint link 10 which incorporates a presently preferred embodiment of this invention. The link 10 includes a center section 12 which in this embodiment takes the form of a metal tube. Various materials can be used, including steel, aluminum, and plastic materials of various sorts. A housing 14 is secured at each end of the center section 12, and each housing 14 receives a ball stud 16 to form a ball joint. As best shown in FIG. 2, each ball stud 16 includes a threaded stud 18 and a ball 20. In this embodiment the ball 20 is non-spherical in a region opposite the stud 18.

Figure 5:
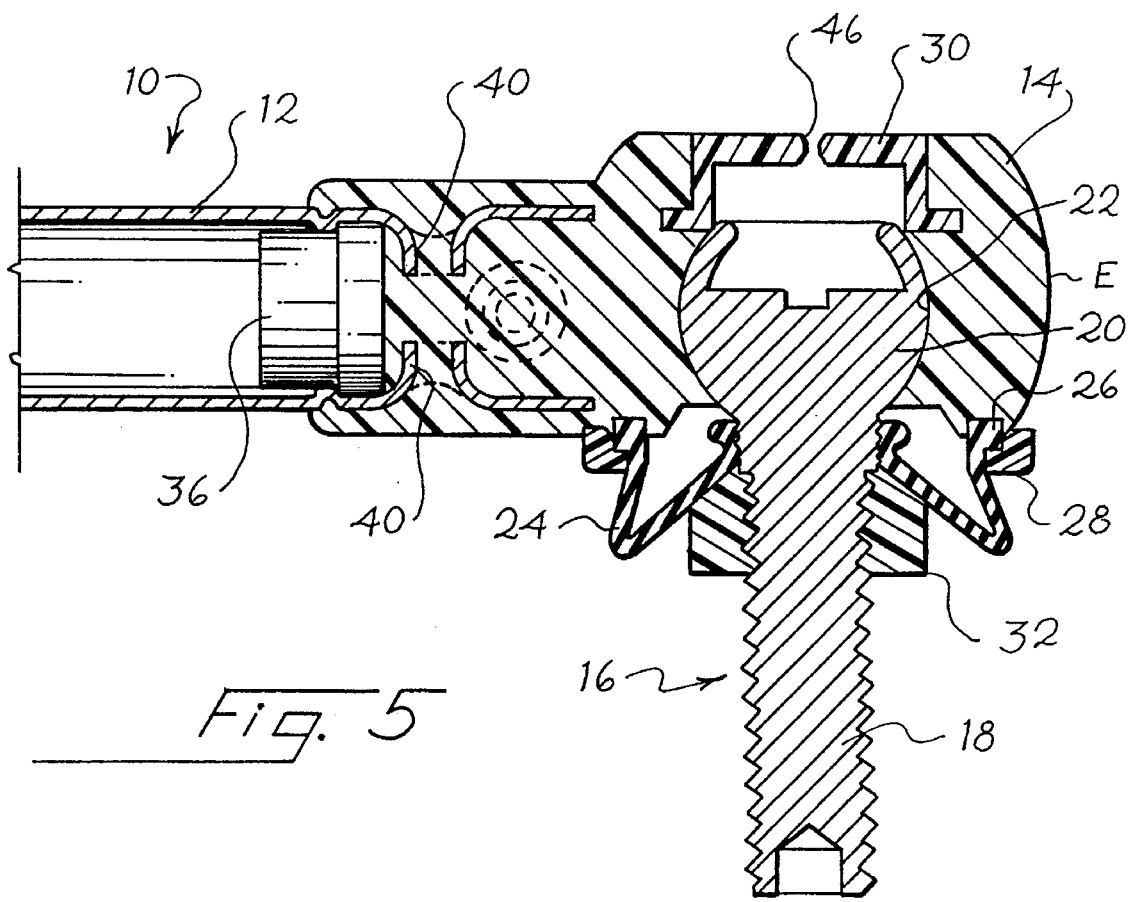
FIG. 5 is a longitudinal sectional view corresponding to FIGS. 3 and 4 at a third, later stage of assembly.

The housing 14 is molded in place as explained below, and it defines a recess wall 22 immediately adjacent to the ball 20. The recess wall 22 forms a bearing surface for the ball 20. The stud 18 extends out of the housing 14, and the region between the stud 18 and the housing 14 is sealed by a flexible boot seal 24. As best shown in FIG. 5, the boot seal defines an annular lip 26, and this annular lip 26 is captured within a thermoplastic retaining ring 28. The retaining ring 28 is in turn secured directly to the housing 14, as for example by ultrasonic welding or a suitable adhesive. The recess in the housing 14 opposite the stud 18 is closed by a cap 30 which is insert molded in place in the housing 14. A nut 32 is threaded on the stud 18 to hold the boot seal 24 in the position shown in FIG. 2.

In this embodiment, the center section 12, the ball stud 16, and the cap 30 are all insert molded within the housing 14. FIG. 3 is a fragmentary view that shows one end of the center section 12 in an initial stage of assembly. Note that the center section 12 defines retaining notches 34 that reduce the inside diameter of the center section 12 somewhat. A molded thermoplastic plug 36 is received within the center section 12 such that a shoulder 38 of the plug 36 bears on the retaining notches 34 to limit the maximum extent to which the plug 36 can move into the center section 12.

Figure 4:
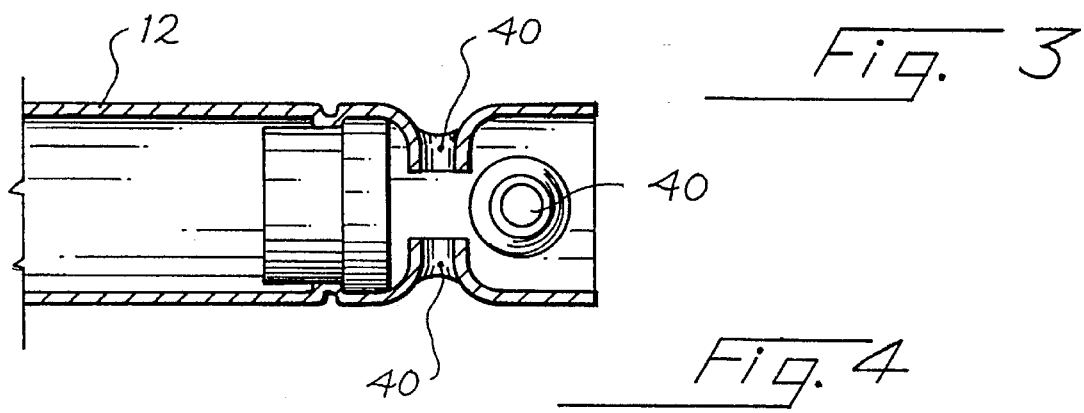
FIG. 4 is a longitudinal sectional view corresponding to FIG. 3 at a second, subsequent stage of assembly.

The next stage in assembly is to form four perforations 40 in each end of the center section 12, as shown in FIG. 4. The perforations are arranged in two diametrically opposed pairs, they extend completely through the center section 12, and the slugs are not left in the tube after the perforation operations are complete. These perforations enhance the strength of the molded joint between the housing 14 and the center section 12.

After the perforations 40 have been formed, the center section 12 of FIG. 4 is installed in an injection molding die, along with the ball stud 16 and the cap 30. A thermoplastic material is then injection molded around the center section 12, the ball stud 16 and the cap 30 such that the entire structural assembly of the ball joint is formed in a single insert molding operation. As shown in FIG. 5, in this insert molding operation the plastic of the housing 14 extends into the center section 12 up to the plug 36 and through the perforations 40, thereby securely holding the housing 14 in place on the center section 12.

In order to maximize the strength of the resulting housing 14, the injection molding operation is preferably arranged such that plastic material enters at an entrance port at a point E on the housing 14 that is as remote as possible from the center section 12. Plastic flows from this entrance port to vents situated on the mold lines at points V at the end of the housing 14 that overlaps the center section 12 to the maximum extent (FIGS. 1 and 2). It has been surprisingly discovered that fiber-reinforced thermoplastic materials can be used to form the recess wall 22. When injection molding is performed as described above, the flow of plastic around the ball 20 tends to align the reinforcing fibers parallel to the recess wall 22. The result is a relatively resin-rich surface for the recess wall 22 without excessive fibers such as might interfere with the formation of a smooth ball joint.

After the insert molding operation described above has been completed, all that remains is to place the boot seal 24 on the stud 18, to secure the retaining ring 28 to the housing 14, and to install the nut 32.

In order to ensure smooth operation of the ball joint, a suitable lubricant can be placed on the ball 20 prior to molding. If the ball 20 is formed of metal, a conventional dry TEFLON™ lubricant can be applied to the ball prior to molding. If the ball 20 is formed of plastic, approximately 5% TEFLON™ can be added to the plastic to increase its lubricity. If desired, lubricant can be added to the ball joint after the insert molding operation via an opening 46 in the cap 30. This opening 46 can subsequently be sealed as, for example, with a heat forming operation.

The ball joint link 10 described above provides a number of important advantages. Since the fiber reinforced thermoplastic material of the housing 14 extends from a first region adjacent to the ball 20 to a second region adjacent to the center section 12, assembly costs are minimized. Since the center section 12 is tubular, the link 10 can be made extremely light in weight. Since the fiber reinforced thermoplastic housing 14 is used without an intermediate bearing between the housing 14 and the ball 20, pull-out resistance of the ball stud 16 is increased. This embodiment has been found to provide high pull-out forces for the ball in excess of 3000 lbs., and for the housing 14 with respect to the center section 12 in excess of 4000 lbs.

By way of example, the housing 14 may be formed of 50% glass-filled Nylon 6/6. A suitable resin can be obtained from LNP as resin RF-700-10, and a suitable glass fiber can be obtained from LNP under the trade name VERTON.

Figure 6:
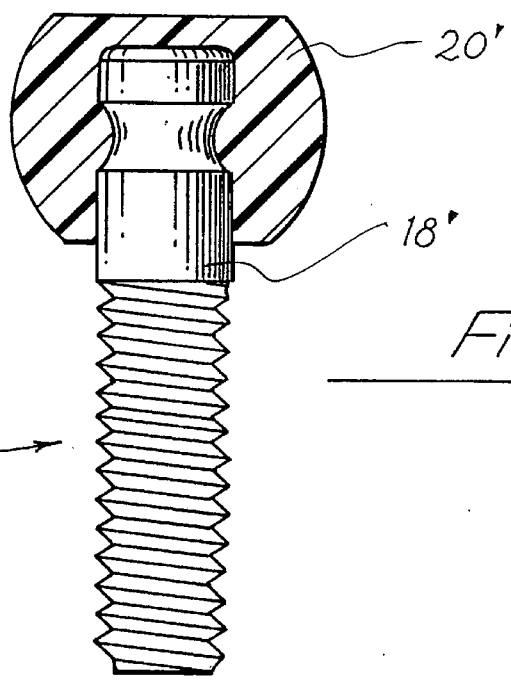
FIG. 6 is a sectional view of an alternate ball stud suitable for use in the link of FIGS. 1–5.

Of course, it should be understood that many changes can be made to the preferred embodiment described above. For example, as shown in FIG. 6, a ball stud 16' can be used that includes a stud 18' that defines an annular recess. The ball 20' can be molded in place on the stud 18'. Additionally, if desired, the ball stud 16, 16' can be formed with a ball 20, 20' that is spherical at the portion opposite the stud 18, 18'. When this is done, the cap 30 can be eliminated and the closed portion of the recess wall 22 opposite the stud 18, 18' can be formed in the insert molding operation discussed above.

Figure 7:
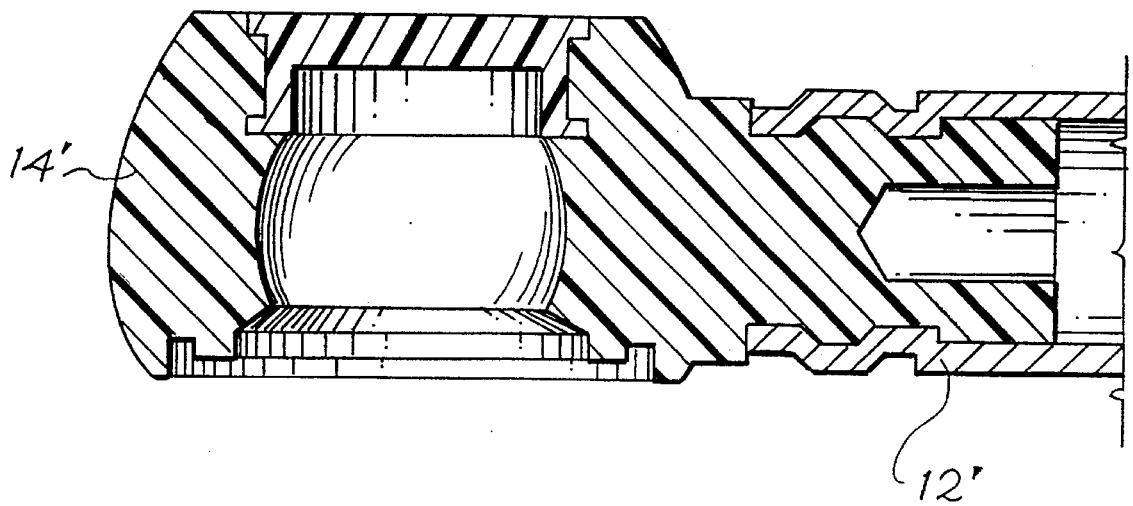
FIG. 7 is a longitudinal sectional view of an alternate housing suitable for use in the link of FIGS. 1–5.

Additionally, as shown in FIG. 7, the center section 12' can be swaged in place on a housing 14'. In this embodiment, the housing 14' preferably includes indents, as shown in FIG. 7, into which an end portion of the center section 12' is forced in a swaging operation. Though no ball stud is shown in FIG. 7, it is intended that a suitable ball stud would be insert molded in the housing 14' as described above.

Of course, any of the foregoing embodiments can be used with a ball joint link having a ball joint at one or both ends of the link, and the housing can be configured such that the ball stud is oriented generally in line with the center section or at any other desired angle.

The foregoing detailed description has been intended as an illustration, not a definition of this invention. It is the following claims, including all equivalents, which are intended to define the scope of protection.

I claim:
1. A ball joint link comprising:
   a tubular first element having an end;
   a ball stud comprising a stud which supports a ball;
   a molded housing secured to the end of the first element and extending around the ball to form a ball joint, said housing comprising a fiber-reinforced plastic material that extends continuously between a first region immediately spatially adjacent the ball and a second region adjacent the end; and
   a plug in the tubular first element near the end, wherein the fiber-reinforced plastic material of the housing substantially fills the tubular first element between the end and the plug, and wherein the end is insert molded in the housing the second region.
2. The ball joint link of claim 1 wherein the fiber-reinforced plastic material comprises a fiber-reinforced thermoplastic material.
3. The ball joint link of claim 1 wherein the end is insert molded in the housing in the second region.
4. The ball joint link of claim 1 wherein the insert molded ball carries a lubricant.
5. The ball joint link of claim 1 wherein the first region is configured to form a socket for the ball, and wherein the fiber-reinforced plastic material forms the socket immediately spatially adjacent the ball.
6. The ball joint link of claim 1 wherein the ball defines a flattened portion opposite the stud.
7. The ball joint link of claim 1 further comprising:
   a boot seal positioned around the stud; and
   a retaining ring positioned around the boot seal and secured to the housing to retain the boot seal on the housing.
8. The ball joint link of claim 1 wherein the stud defines an annular recess, and wherein the ball is molded in place on the stud and fills the recess.
9. The ball joint link of claim 1 wherein the first element comprises a center section.
10. The ball joint link of claim 1 further comprising a cap secured in place to the housing adjacent a portion of the ball opposite the stud, said cap at least partially enclosing a space adjacent the ball.
11. The ball joint link of claim 10 wherein the cap is molded in place in the housing.
12. The ball joint link of claim 11 wherein the space contains a lubricant.
13. The ball joint link of claim 11 wherein the ball comprises a non-spherical surface adjacent the cap.
14. A ball joint link comprising:
   a tubular first element having an end;
   a plug in the tubular first element near the end;
   a ball stud comprising a stud which supports a ball; and
   a molded housing secured to the end of the first element and extending around the ball to form a ball joint, said first element end and said ball both insert molded in said housing in a single molding operation;
   wherein the fiber-reinforced plastic material of the housing substantially fills the tubular first element between the end and the plug.
15. The ball joint link of claim 14 wherein the tubular first element comprises a metal tube, and wherein the housing comprises a fiber-reinforced thermoplastic material.

16. The ball joint link of claim 15 wherein the fiber-reinforced thermoplastic material forms a recess wall positioned immediately specially adjacent to the ball.

17. The ball joint link of claim 14 wherein the first element comprises a center section.

18. The ball joint link of claim 14 further comprising a cap secured in place to the housing adjacent a portion of the ball opposite the stud, said cap at least partially enclosing a space adjacent the ball.

19. The ball joint link of claim 18 wherein the cap is molded in place in the housing.

20. The ball joint link of claim 19 wherein the space contains a lubricant.

21. The ball joint link of claim 19 wherein the ball comprises a non-spherical surface adjacent the cap.

22. A ball joint link comprising:

a tubular center section having an end;

a ball stud comprising a stud which supports a ball;

a cap positioned adjacent a portion of the ball opposite the stud, said cap at least partially enclosing a space adjacent the ball; and a molded housing secured to the end of the center section and extending around the ball to form a ball joint, said cap insert molded in said housing;

a plug in the tubular center section near the end, wherein the fiber-reinforced thermoplastic material substantially fills the tubular center section between the end and the plug.

23. The ball joint link of claim 22 wherein the space contains a lubricant.

24. The ball joint link of claim 22 wherein the ball comprises a non-spherical surface adjacent the cap.

25. The ball joint link of claim 22 wherein the housing comprises a fiber-reinforced thermoplastic material.

26. The ball joint link of claim 25 wherein the ball is insert molded in the housing.

27. The ball joint link of claim 26 wherein the end is insert molded in the housing.

28. The ball joint link of claim 25 wherein the fiber-reinforced material forms a socket immediately spatially adjacent the ball.

* * * * *